Fig. 1.

Inventor:
William H. Taylor,
By Wilkinson, Huxley, Byron & Knight attys.

March 27, 1934. W. H. TAYLOR 1,952,638
MATERIAL TREATING APPARATUS
Filed March 20, 1930  6 Sheets-Sheet 2

Inventor
William H. Taylor,
By Wilkinson, Huxley, Byron & Knight Attys

March 27, 1934.   W. H. TAYLOR   1,952,638
MATERIAL TREATING APPARATUS
Filed March 20, 1930   6 Sheets-Sheet 3

Inventor:
William H. Taylor,
By Wilkinson, Huxley, Byron & Knight attys.

Patented Mar. 27, 1934

1,952,638

UNITED STATES PATENT OFFICE 1,952,638

MATERIAL TREATING APPARATUS

William H. Taylor, Brookfield, Ill., assignor, by mesne assignments, to Industrial Patents Corporation, Chicago, Ill., a corporation of Illinois Application March 20, 1930, Serial No. 437,306

22 Claims. (Cl. 99—2)

This invention relates to material treating apparatus, and is illustrated as embodied in apparatus which may be used for cooling, whitening and texturating lard.

More specifically, the embodiment of this invention which has been illustrated includes a treatment chamber through which lard is forced by pumps which are preferably so regulated that the lard is under constant pressure, preferably approximately atmospheric. The chamber has been shown as composed of a number of hollow plates within which circulates brine and between which are rotated scrapers to insure the constant circulation of the lard and for the purpose of beating the lard. Finely perforated texturating plates may in addition be provided, as may automatic temperature control means.

One object of the invention is to provide means for more efficiently and more satisfactorily treating lard or other substances.

The apparatus used commercially in the past has consisted mainly of a large internally cooled drum onto which the lard was flowed, and separate air mixing troughs. Not only was it much larger and more cumbersome than the present apparatus, but considerable difficulty was experienced in mixing in just the right proportion of air and in beating and cooling the lard to the exact degree and during the particular length of time that would leave the lard in the best commercial form of whiteness, smoothness and firmness, and in the best condition for setting. It is noted that although the trade demands a lard that is whitened by gas mixed therewith, the setting of the lard should not be interfered with by beating too much or at the wrong time. The setting of lard is in some characteristics similar to the setting of cement and is not merely a matter of cooling under any conditions which may occur.

Another object of the invention is to provide apparatus which will cool lard faster than machines of the same size heretofore known.

A further object of the invention is to provide apparatus which will cool a substance such as lard or other shortening products, for example, with sufficient rapidity so that it may be cooled below its setting temperature (i. e. supercooled), removed from contact with the chilling medium before setting up, and preferably texturated concurrently with the setting up process, and before complete crystallization takes place.

An additional object of the invention is to provide means for thoroughly and evenly mixing a given proportion of air or other substance with lard in such manner and under such conditions, especially in conjunction with rapid supercooling that the resulting mixture will be the most desirable commercial form of lard. With the apparatus of this invention lard can be made which will have superior creaming qualities to that of former lards, i. e. which will produce a cake of greater volume and therefore greater lightness than former lards, other factors being the same.

A further object of the invention is to provide an apparatus for treating lard which will leave the lard in such a condition that it will set hard after being poured into buckets.

Other objects and advantages of this invention will appear from the following description.

In the drawings, in which one embodiment of the invention has been illustrated and wherein like reference characters have been used to designate like parts—

Figure 1:
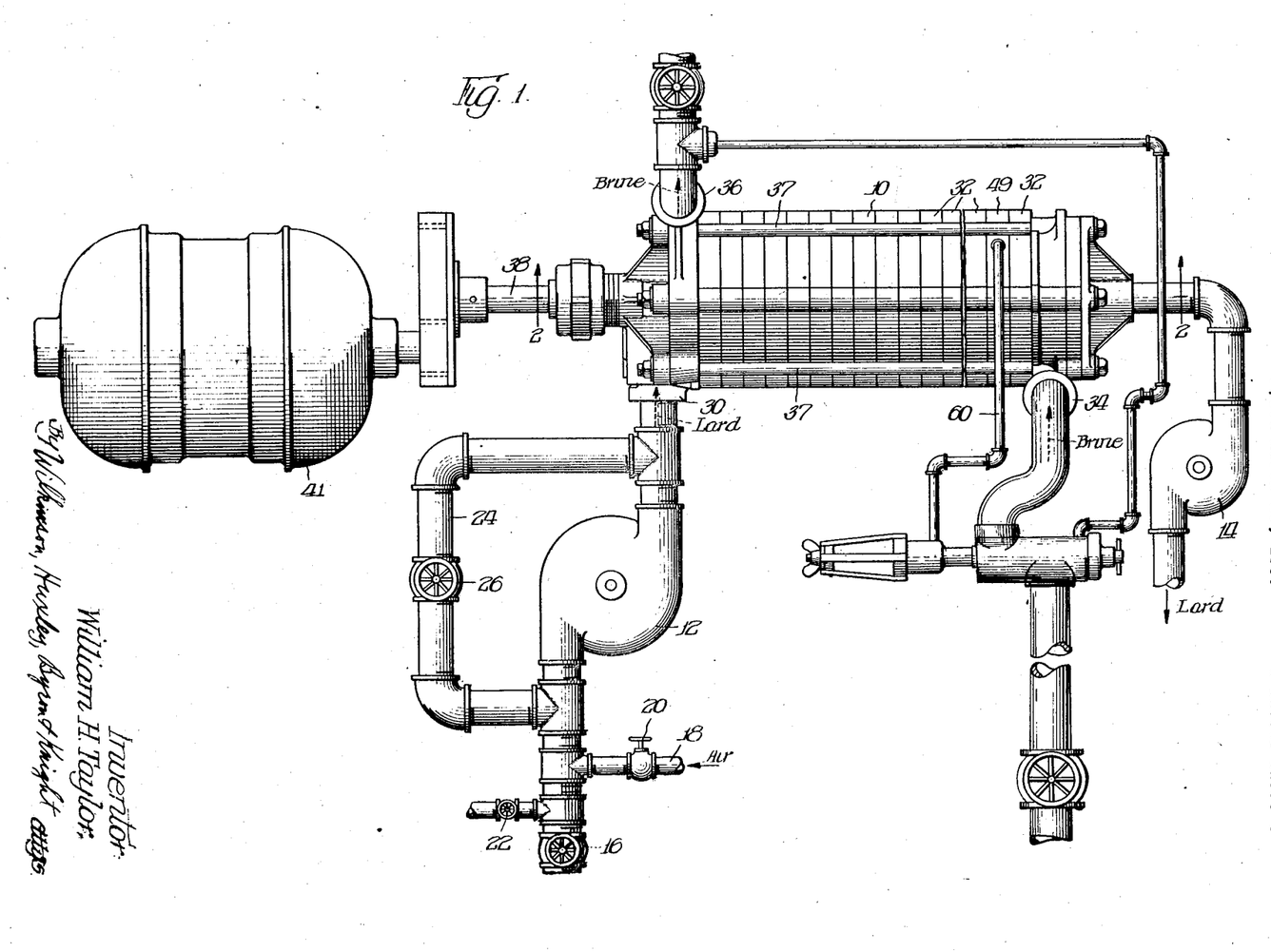
Figure 1 is a more or less diagrammatic view showing the relation of the various parts of the apparatus.
Figure 2:
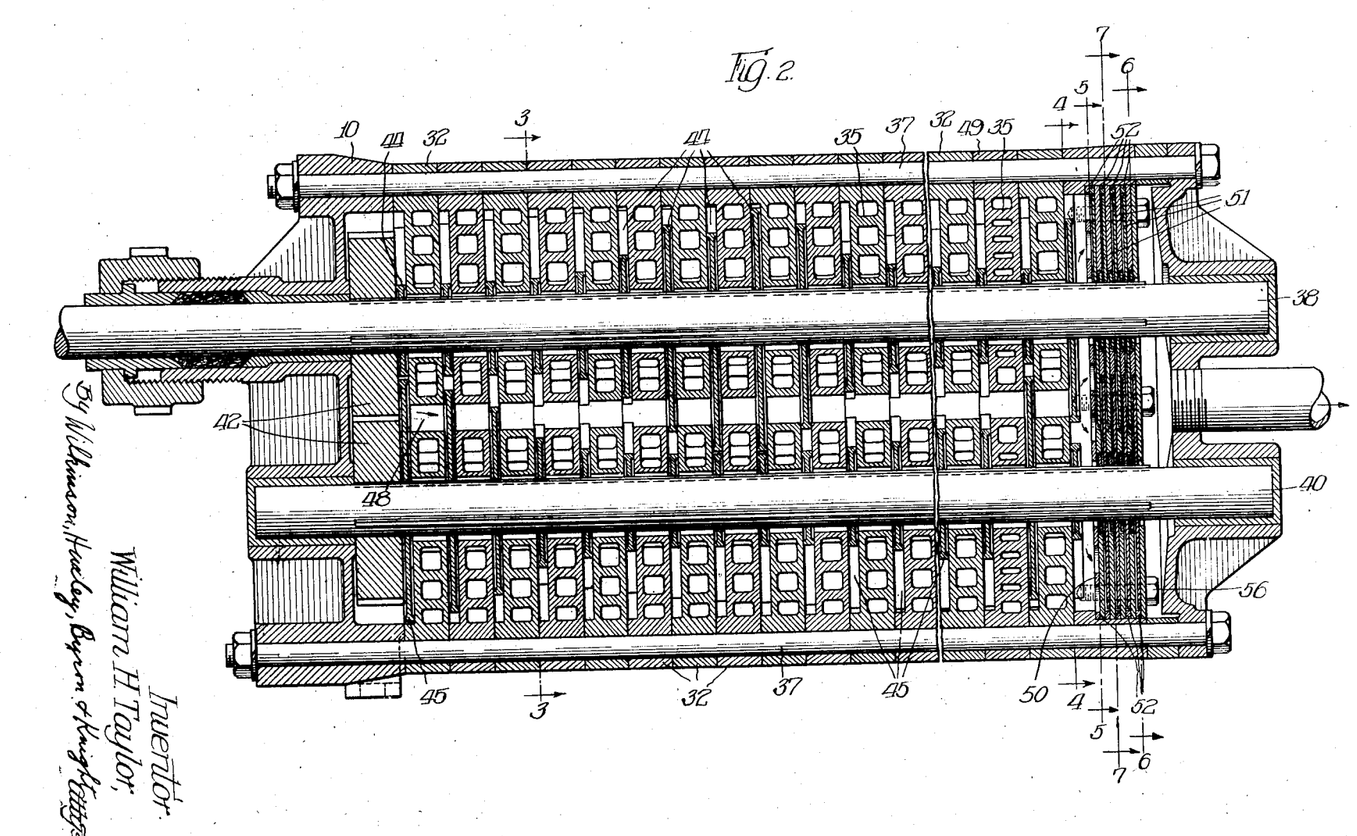
Figure 2 is a section along line 2—2 of Figure 1, showing details of the treatment chamber.
Figure 3:
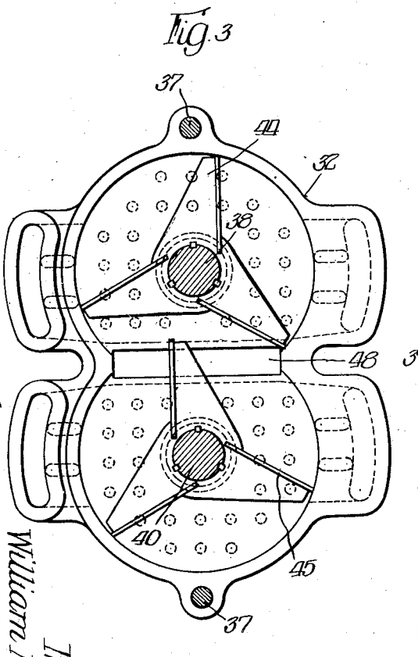
Figure 3 is a section along line 3—3 of Figure 2.
Figures 7, 8, 9:
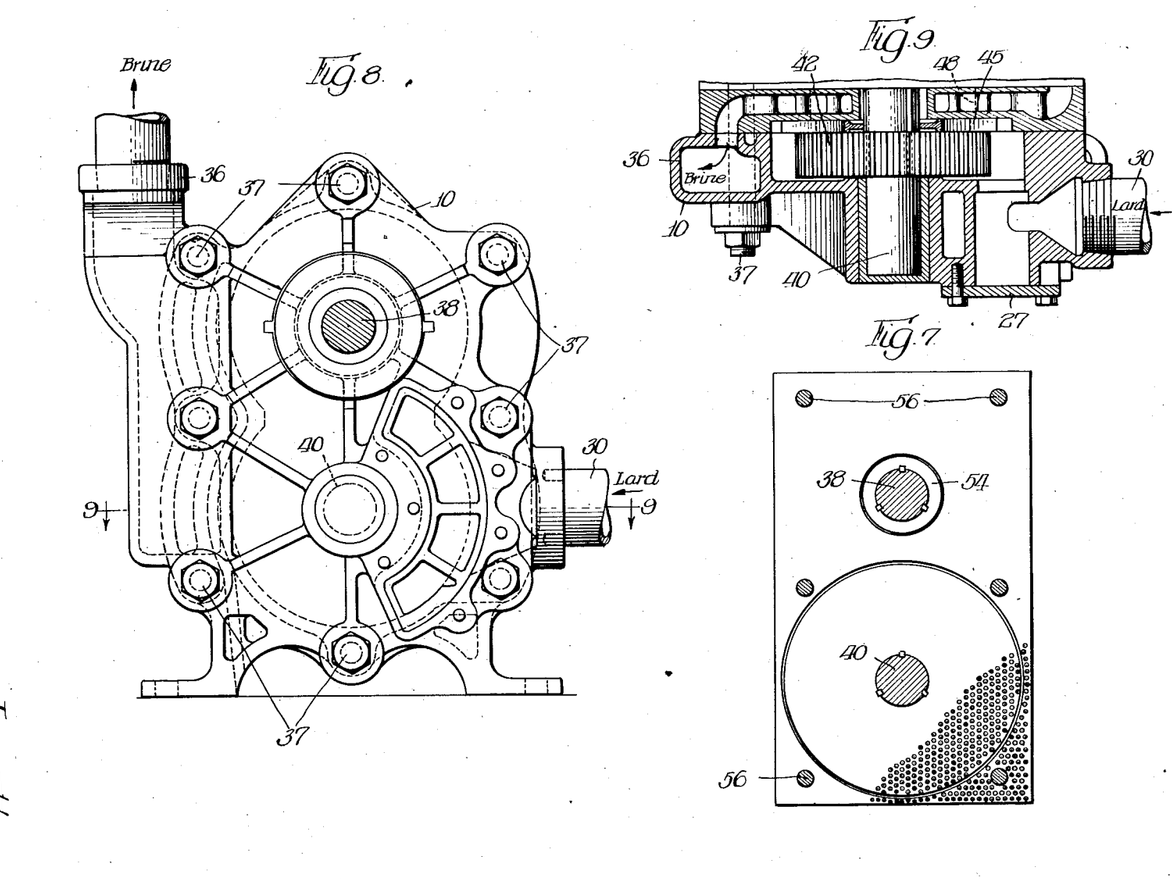
Figure 8 is an elevation showing the lard inlet end of the treatment chamber.
Figure 9 is a section taken along the line 9—9 of Figure 8.

The preferred embodiment of my invention consists of a treatment chamber 10 through which lard is forced by pumps 12 and 14 which are normally so regulated that the lard is under constant pressure and moves at constant speed. The supply of lard may be regulated by the valve 16. Air is supplied through pipe 18 and the quantity thereof is regulated preferably by needle valve 20. Steam may also be admitted by valve 22, as for the purpose of flushing out the system. A by-pass 24 with a relief valve 26 is provided around the pump 12 to avoid excessive load on the pump 12 and to avoid excessive pressure on the treatment chamber in case the system should become clogged at any point. Lard is forced by the pump 12 into the lard inlet 30, shown in detail in Figures 8 and 9, into the treatment chamber 10. Suitable straining means may be provided if desired, which may be cleaned or removed by removing cover 27. The treatment chamber 10 is preferably composed mainly of a plurality of cast aluminum plates or sections 32 which are hollow to form an internal chamber for the passage of brine. Aluminum pegs 35 are provided for reenforcement and to aid heat exchange. The brine is admitted at inlet 34, passes through each of the cooling sections in succession, as indicated in Figure 9, and is expelled through the outlet 36. The sections are held together by two or more tie-rods 37, as shown in Figures 2 and 3. Extending throughout the length of the treatment chamber are two shafts 38 and 40. Shaft 38 is rotated by motor 41 through suitable gearing, and shaft 40 is rotated by shaft 38 through gears 42. Thus shafts 40 and 38 rotate at the same speed in opposite directions. Keyed to the shafts 38 and 40 are pairs of scrapers 44 and 45 lying between each of the sections of the treatment chamber. These scrapers are shown in detail in Figure 3, from which it is seen that the scrapers are preferably three-fingered and mesh with one another at the center. Through the centers of each of the sections of the treatment chamber are passages 48 which form a channel lengthwise of the treatment chamber. The lard entering the treatment chamber through the inlet 30 is carried by the scrapers to this center passage, through which it is forced to the next section where it is again caught by the scrapers and carried around in contact with the cooling section, and so on through the entire length of the treatment chamber.

Adjacent to the sections 32 is a thermostatic section 49, preferably near the lard discharge end of the treatment chamber. Instead of conducting brine, this section contains a liquid such as alcohol, which expands on heating and operates the thermal controlling device in a manner to be described below. This chamber may have more internal pegs 35 than the others to quicken response to temperature changes. The brine will obviously be by-passed either around, or directly through this section 49 in a separate conduit. The scrapers are preferably arranged to fit within .002 inch of the surface of the sections, thus preventing the formation of a thick, hard, chilled layer on the cooling sections, or of an insulating layer on the thermal responsive section.

Figure 4:
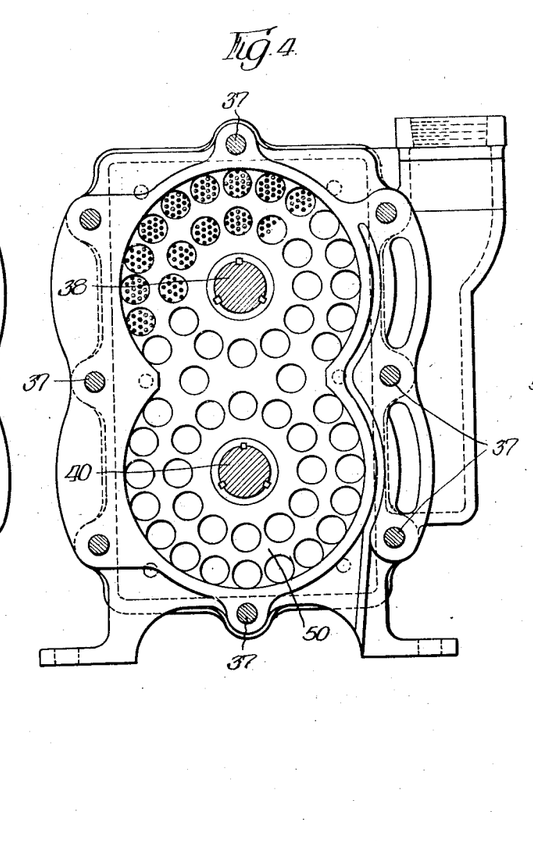
Figure 4 is a section along line 4—4 of Figure 2.
Figure 5:
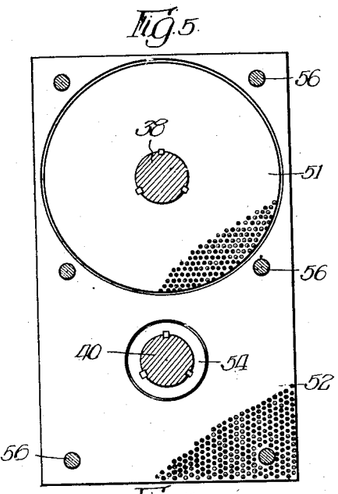
Figures 5, 6 and 7 are sections along the lines 5—5, 6—6 and 7—7 respectively of Figure 2, and show details of the texturator.
Figure 6:
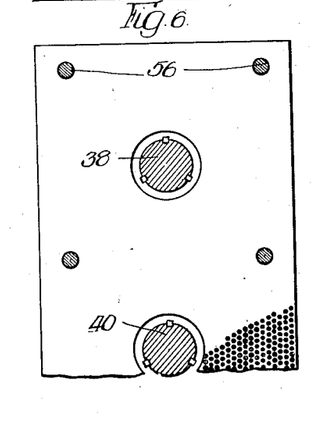

Beyond the cooling sections of the treatment chamber is the texturator in which the lard is thoroughly worked or plasticized to a uniform texture. Here the lard passes through the perforated plate 50 shown best in Figure 4 and then through several layers of relatively moving plates 51 and 52 perforated with holes of approximately ⅛ inch in diameter. First there is a rotary plate 51 which, being keyed to shaft 38, revolves in a circular hole cut in a stator plate 52 as shown best in Figure 5. This stator plate has another opening about the shaft 40 in which rotates a circular disc 54. In the next layer, the arrangement is just reversed, as shown in Figure 7. The final layer is merely a perforated backing plate extending entirely across the treatment chamber, leaving a small clearance around shafts 38 and 40 and being perforated as desired as shown in Figure 6. The stationary plates may be held in place by any desired means, such as the bolts 56. The various rotary plates 51 are preferably in such relation and the perforations in them and in the stator plates 52 are preferably so arranged and staggered, that at all times a substantially equal number of passages will be in alignment. This will give a constant flow area and avoid uneven flowing of the lard. It is desirable to have this texturator located adjacent to the cooler not only for the sake of simplicity of construction but also to finish the texturation promptly enough after the cooling to avoid any interference with the hard setting of the lard.

Figure 10:
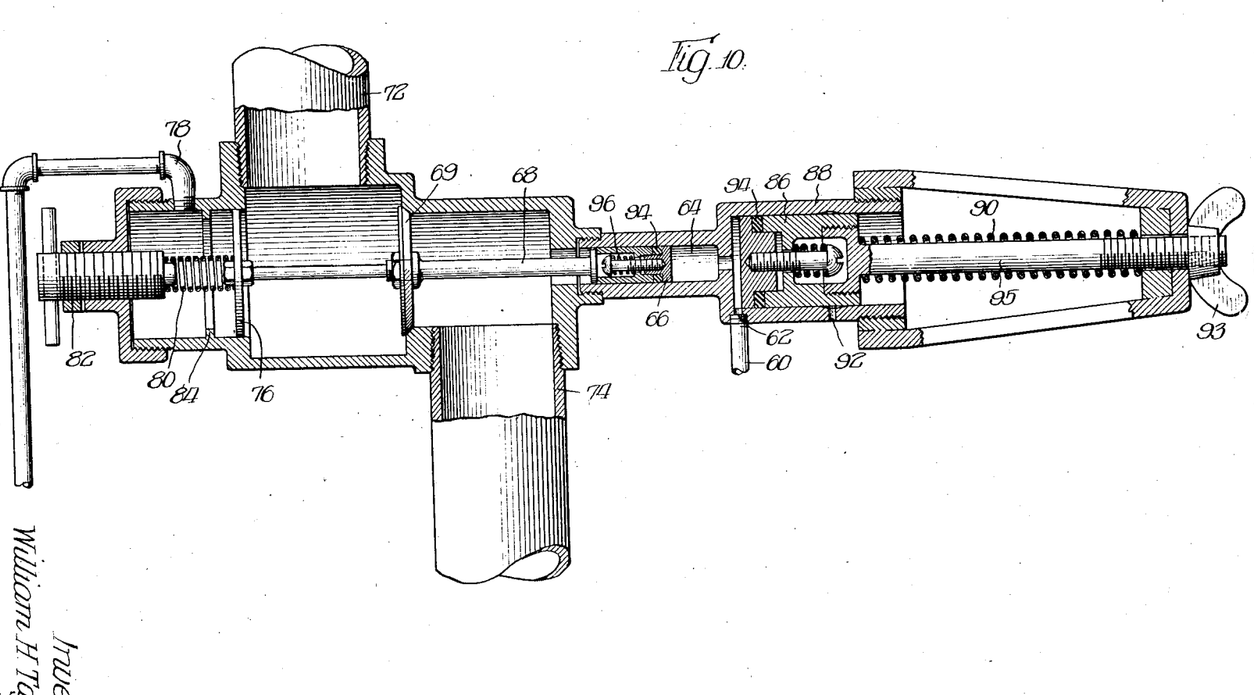
Figure 10 is a view partly in section and partly diagrammatic, showing the temperature control apparatus.
Figure 11:
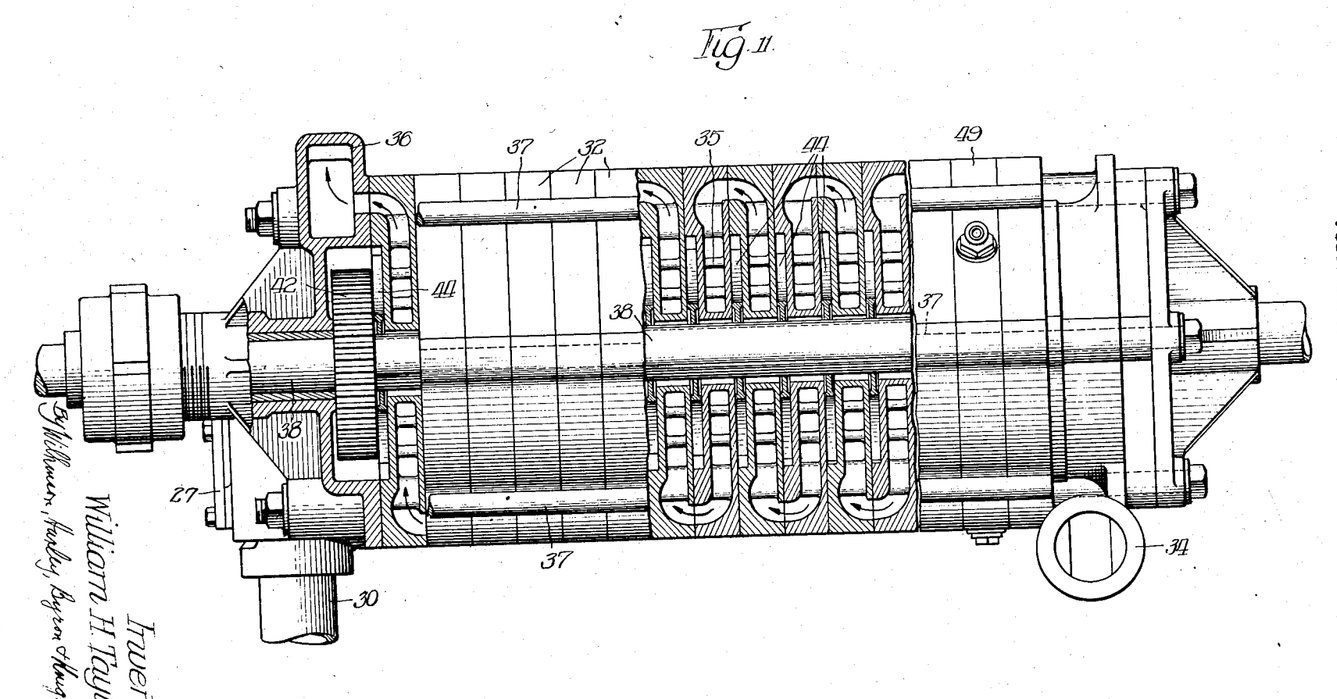
Figure 11 is a view partly in section along the line 11—11 of Figure 2, illustrating the passages for the circulation of the brine.

The temperature is controlled in the following manner. When there is a rise in temperature, the alcohol in the thermal responsive section expands outwardly through pipe 60 where it enters the thermal control device at the inlet 62, as shown in Figure 10. Through suitable mechanism the expanding fluid forces open the brine valve, thereby sending more brine through the treatment chamber to overcome the rise in temperature. In the temperature control device, the alcohol is forced into cylinder 64 where it acts on piston 66. Piston 66 moves the piston rod 68 which opens the brine valve 69, permitting brine to flow from the brine supply line 72 to the connection 74 with the treatment chamber. In order that the pressure in the brine supply line will not hold the valve 69 seated, a counter piston 76 is provided. This fits loosely in its cylinder and consequently brine will slowly leak around it. To prevent back pressure on piston 76, an outlet 78 is provided which is connected to the pipe by which the brine returns from the treatment chamber to a cooler and pump. As the brine valve 69 opens, the pressure on its outlet side increases, thus tending to equalize the pressure on its two sides and to make the resultant pressure on this valve less than the opposed pressure on piston 76. To overcome this and to aid in closing the valve 69, a spring 80 is provided which may be adjusted by a screw 82. The spring 80 is preferably of a size, weight and tension to always slightly more than overbalance the effective pressure of the brine, thus closing the brine valve except when it is opened by pressure of the alcohol on piston 66.

The opening of the valve 69 is limited by the contact of piston 76 with ring 84. However, in case the brine supply should cease, the temperature of the treatment chamber would of course continue to rise. It is therefore necessary to provide safety expansion features. To take care of the abnormal expansion, piston 86 is provided in the cylinder 88 which opens into cylinder 64. Piston 86 is normally held in the position shown by a spring 90 which is sufficiently strong to overbalance the resistance of the brine valve system until the piston 76 strikes ring 84. Then on continued expansion of the alcohol, piston 86 is forced outwardly to the extent necessary. If it is forced far enough to clear the safety outlet 92, the alcohol will escape, thus obviating all danger of injury to the apparatus.

When there is a given quantity of alcohol in the system the temperature at which the brine valve opens can be regulated by turning the nut 93 which screws on the rod 95 of the piston 86. This regulates the innermost position to which spring 90 can force piston 86. Obviously if the piston 86 is held further out than shown, the alcohol could expand more in cylinder 88 before it was compelled to expand into cylinder 64 and expel piston 66, opening valve 69.

The pistons 66 and 86 are sealed against leakage of the alcohol by means of rubber washers 94 which are constantly expanded against the sealed walls by the action of the springs 96.

From the drawings and the above description, it is clear that the operation is as follows:

Hot lard is pumped into the treatment chamber by pump 12 together with air which is emitted through valve 20, the relief valve 26 being normally closed. The lard fills the treatment chamber where it is cooled and from which it is drawn by the pump 14. Constant circulation of the lard and constant exposure of the heat exchange surface is secured by means of rotors 44 and 45 which scrape the lard from the surfaces as it becomes cool. These scrapers, which are preferably driven at about 500 R. P. M., also have an efficient beating effect on the lard, thus aiding in thoroughly mixing the air therewith.

As the lard leaves the cooling surfaces, it is forced through the texturating plates 51 and 52, forming a very thin film between them and being constantly beaten by the relative motion of the respective plates. The lard will therefore leave the texturator thoroughly mixed with the right quantity of air and with the texture uniform, firm and smooth, in accordance with the requirements of the trade. By proper regulation of the speed of the parts and by keeping the pressure on the lard constant, preferably approximately atmospheric, and by proper regulation of the temperature, the lard will be delivered in a condition for quick and hard setting and having the other qualities of the best commercial form of lard.

The lard as it is about to leave the cooler contacts with the thermostatic section 49, thus affecting the temperature of the alcohol therein. The scrapers prevent the lard from forming an insulating layer around this unit. If the lard is too warm, the alcohol will expand and enter the cylinder 64 to act on the piston 66 to throw open valve 69 and admit more brine to the cooling surfaces 32 of the treatment chamber 10. If the lard becomes too cool, the spring 80 together with the pressure on the brine will partially close valve 69 and force the alcohol back into the thermostatic section 49.

It is to be understood that this embodiment of the invention has been illustrated and described merely by way of illustration and that various other forms of the device will of course be apparent to those skilled in the art.

I therefore claim as my invention:

1. Substance treating apparatus including a stack of hollow plates constructed and arranged to form a passage therewithin, means for passing a fluid through said passage, means for passing another substance in contact with said plates, and means for beating said substance and scraping it from the plates at a speed and frequency high enough to prevent solidification of the substance on said plates.

2. Substance treating apparatus including a chamber having hollow walls and adapted to contain a substance being treated, means for passing fluid through said walls, and a pair of substantially intermeshing devices arranged to remove the substance from said walls and to beat said substance.

3. Substance treating apparatus including a series of hollow plates, means for passing fluid in the interior of said plates, said plates being in sealing engagement with one another at their peripheries but spaced apart through most of their area, means for forcing a second fluid between said plates, and intermeshing means for scraping said second fluid from said plates and beating it.

4. Substance treating apparatus including spaced hollow plates arranged to form a passage for a fluid, all of said plates having openings therethrough at substantially their centers and being in sealing engagement with one another at their peripheries, thus forming another internal and independent passage for another substance, and means on each side of said openings intermeshing in alignment with said openings for removing the substance from said plates and for beating said substance.

5. Substance treating apparatus including spaced hollow plates arranged to form a passage for a fluid, all of said plates having openings therethrough at substantially their centers and being in sealing engagement with one another at their peripheries, thus forming another internal and independent passage for another substance, means on each side of said openings intermeshing in alignment with said openings for removing the substance from said plates and for beating said substance, a texturator adjacent thereto, and means for forcing a substance through said second named passage and said texturator successively.

6. Substance treating apparatus including spaced hollow plates arranged to form a passage for a fluid, all of said plates having openings therethrough at substantially their centers and being in sealing engagement with one another at their peripheries, thus forming another internal and independent passage for another substance, means on each side of said openings intermeshing in alignment with said openings for removing the substance from said plates and for beating said substance, adjacent thereto a texturator comprising series of relatively movable approximately contacting plates perforated with small holes, and means for forcing a substance through said second named passage and said texturator successively.

7. Substance treating apparatus including a series of plates, means for forcing a substance to contact them in sequence, means for cooling some of said plates, one of the other of said plates constituting a thermostatic element, and means controlled thereby for regulating said means for cooling.

8. Substance treating apparatus including a series of plates, means for forcing a substance to contact them in sequence, means for cooling some of said plates, one of the other of said plates containing a liquid and connected with a device operated by expansion and contraction of the liquid for regulating the cooling effect said means for cooling has on the other plates.

9. Heat exchange apparatus for mixing and cooling material, comprising a double walled chamber having independent passageways in heat exchange relation for continuous flow of a cooling medium and the material treated, means for mixing the material treated and continuously removing said material from the walls of its passageway, and means for regulating the flow of the cooling medium by the temperature of a wall from which the treated material is being continuously removed.

10. Heat exchange apparatus including a series of plates constructed and arranged to form a passage therethrough, means for effecting passage of heat through some of said plates, one of said plates containing a liquid, and means whereby the expansion of the liquid will change the amount of heat passing through the first mentioned plates.

11. Substance treating apparatus including a series of plates, means for forcing a substance to contact them in sequence from first to last, means for circulating a cooling fluid in contact with all of said plates but one, said one plate constituting a thermostatic element and being located at least three-fourths of the way from the first plate toward the last plate of the series, and means controlled by said thermostatic element for regulating the flow of said cooling fluid.

12. Substance treating apparatus including a series of plates, means for forcing a substance to contact them in sequence from first to last, means for circulating a cooling fluid in contact with all of said plates but one, said one plate constituting a thermostatic element and being located at least three-fourths of the way from the first plate toward the last plate of the series, means controlled by said thermostatic element for regulating the flow of said cooling fluid, and means for constantly agitating said substance to allow fresh portions thereof to contact all of said plates.

13. The combination of apparatus for mixing a gas with a substance which congeals on cooling, a pump constantly and uniformly acting on said substance to force the same through said apparatus, temperature control means for maintaining the flow of said substance through said apparatus uniform by maintaining an even temperature of the substance in said apparatus, and a pump constantly acting for pumping said substance after it leaves said apparatus and so located as to avoid back pressure on said substance in said apparatus, said temperature control means comprising means for circulating the cooling fluid in contact with said apparatus, and a thermostatic element in contact with the substance being treated in said apparatus, means controlled thereby for regulating said means for circulating the cooling fluid.

14. Substance treating apparatus including spaced hollow plates arranged to form a passage for a cooling fluid, all of said plates having aligned openings therethrough and being in sealing engagement with one another at their peripheries, thus forming an internal and independent passage for the substance to be treated and chambers between said plates communicating with said independent passage, means located in each chamber for sweeping across the said independent passage and conveying such substance into said chamber in contact with the walls thereof and back into said independent passage, and means for pumping said substance through said independent passage.

15. Substance treating apparatus including spaced hollow plates arranged to form a passage for a fluid therewithin, all of said plates having substantially aligned openings therethrough and being in sealing engagement with one another at their peripheries, thus forming another internal and independent passage for the substance to be treated, means for passing such substance through said independent passage, and means for beating said substance and scraping it from the plates at a speed high enough to prevent solidification of the substance on said plates.

16. Substance treating apparatus including spaced hollow plates arranged to form a passage for a cooling fluid, all of said plates having aligned openings therethrough and being in sealing engagement with one another at their peripheries, thus forming an internal and independent passage for the substance to be treated and also forming chambers between said plates communicating with said independent passage, means located in each chamber for sweeping across the said independent passage and conveying such substance into said chamber in contact with the walls thereof and back into said independent passage.

17. Substance treating apparatus including spaced hollow plates arranged to form a passage for a cooling fluid, all of said plates having aligned openings therethrough and being in sealing engagement with one another at their peripheries, thus forming an internal and independent passage for the substance to be treated and also forming chambers between said plates communicating with said independent passage, means located in each chamber for sweeping across the said independent passage and conveying such substance into said chamber in contact with the walls thereof.

18. Substance treating apparatus including a series of hollow plates, means for passing fluid in the interior of said plates, said plates being in sealing engagement with one another at their peripheries, but spaced a very short distance apart through most of their area to form cooling chambers having extremely low volume but extensive cooling surface, means for forcing a second fluid between said plates, and intermeshing means for scraping said second fluid from said plates and beating it.

19. Substance treating apparatus including a series of hollow plates, means for passing fluid in the interior of said plates, said plates being in sealing engagement with one another at their peripheries, but spaced a very short distance apart through most of their area to form cooling chambers having extremely low volume but extensive cooling surface, means for forcing a second fluid between said plates, and intermeshing means for scraping said second fluid from said plates and beating it; said plates being shaped with their walls receding from the zone of intermeshing of said intermeshing means to form a zone in which the intermeshing means do not scrape the walls, so that said second fluid may swirl freely around said intermeshing means.

20. Material treating apparatus comprising a container, means for continuously flowing a cooling fluid in contact with said container, means for continuously flowing through said container edible fats melted to a liquid state, means for continuously flowing a suitable quantity of gas into said container for mixture with said fats, means within said container for scraping the fats from the walls thereof with sufficient frequency to substantially prevent the setting of said fats on said walls and for beating gas into said fats and mixing said fats, and a texturator located close to said last named means and so connected thereto that the mixture of fats and gas flows immediately from said last named means to said texturator, said texturator being of a form which rapidly, minutely and completely intermixes and plasticizes the mixture which is supplied thereto.

21. Material treating apparatus including the combination of beating and cooling means for simultaneously beating and cooling a substance which comprises chiefly a congealable oil, means for cooling some of the portions of said beating and cooling means contacted by said substance, texturating means for finely texturating said substance, and means for pumping said substance through the beating and cooling means and immediately thereafter through the texturating means.

22. Material treating apparatus including the combination of beating and cooling means for simultaneously beating and cooling a substance which comprises chiefly a congealable oil, means for cooling some of the portions of said beating and cooling means contacted by said substance, said beating and cooling means including means for scraping said substance from the surface of said cooled portions, texturating means for finely texturating said substance, and means for pumping said substance through the beating and cooling means and immediately thereafter through the texturating means.

WILLIAM H. TAYLOR.